United States Patent [19]

Bonola

[11] Patent Number: 5,742,514
[45] Date of Patent: Apr. 21, 1998

[54] INTEGRATED REMOTE ASYNCHRONOUS POWER SWITCH

[75] Inventor: Thomas Joseph Bonola, Tomball, Tex.

[73] Assignee: Compaq Computer Corporation, Houston, Tex.

[21] Appl. No.: 712,186

[22] Filed: Sep. 11, 1996

Related U.S. Application Data

[63] Continuation of Ser. No. 350,512, Dec. 6, 1994, abandoned, which is a continuation of Ser. No. 963,375, Oct. 20, 1992, abandoned.

[51] Int. Cl.$^6$ .............................. G06F 11/30; H04M 11/00
[52] U.S. Cl. ................... 364/492; 364/483; 395/750.02; 395/750.06; 395/750.08; 379/258; 379/309
[58] Field of Search ..................... 364/492, 480, 364/481, 482, 483, 493, 709.16, 514 R; 379/93, 96, 98, 15, 112, 256, 258, 307, 309; 395/750, 750.02, 750.01, 750.05, 750.06, 750.07, 750.08, 200.57, 200.09

[56] References Cited

U.S. PATENT DOCUMENTS

| | | | |
|---|---|---|---|
| 4,051,326 | 9/1977 | Badagnani et al. | 379/96 |
| 4,206,441 | 6/1980 | Ferlan | 340/147 R |
| 4,647,721 | 3/1987 | Busam et al. | 379/102 |
| 4,656,318 | 4/1987 | Noyes | 379/93 |
| 4,677,566 | 6/1987 | Wittaker et al. | 364/492 |
| 4,701,946 | 10/1987 | Oliva et al. | 379/98 |
| 4,723,269 | 2/1988 | Summerlin | 379/102 |
| 4,878,196 | 10/1989 | Rose | 395/750 |
| 4,922,450 | 5/1990 | Rose et al. | 364/900 |
| 5,051,720 | 9/1991 | Kittirutsunetorn | 340/310 R |
| 5,163,124 | 11/1992 | Yabe et al. | 395/750 |
| 5,191,323 | 3/1993 | Abbes et al. | 340/385.37 |
| 5,198,806 | 3/1993 | Lord | 340/825.31 |
| 5,216,704 | 6/1993 | Williams et al. | 379/93 |
| 5,239,652 | 8/1993 | Seibert et al. | 395/750 |
| 5,347,167 | 9/1994 | Singh | 307/125 |
| 5,388,211 | 2/1995 | Hornbuckle | 395/200 |
| 5,410,713 | 4/1995 | White et al. | 395/750 |

OTHER PUBLICATIONS

Mailing Postcard, "Remote Power On/Off", Server Technology, Inc., Santa Clara, CA 95051. (month and year are not available).

"PhoneBoot", Advertisement, Cybex Corporation, PC Week, Aug. 17, 1992, p. 99.

*Primary Examiner*—Tan Q. Nguyen
*Attorney, Agent, or Firm*—Vinson & Elkins L.L.P.

[57] ABSTRACT

A computer system has a power supply including switched and unswitched power nodes supplying the appropriate DC voltages for the computer system's internal circuitry. Portions of the computer system's internal circuitry for receiving external communications are coupled to the unswitched power node. Other circuitry is coupled to the switched power node. Responsive to a request from a remote computer, switching circuitry enables power through the switched nodes, thereby powering the computer system. The switching circuitry can enable the switched power node responsive to a signal from an external device, such as an external modem, or through a signal generated by internal communications hardware.

7 Claims, 2 Drawing Sheets

INTEGRATED REMOTE ASYNCHRONOUS POWER SWITCH

RELATED APPLICATIONS

This application is a Continuation of application Ser. No. 08/350,512, filed Dec. 6, 1994, and entitled "Integrated Remote Asynchronous Power Switch," now abandoned, which is a continuation of application Ser. No. 07/963,375, filed Oct. 20, 1992, and entitled "Integrated Remote Asynchronous Power Switch", now abandoned.

TECHNICAL FIELD OF THE INVENTION

This invention relates in general to computers, and more particularly to an integrated remote asynchronous power switch for a computer.

BACKGROUND OF THE INVENTION

Increasingly, communication between computers is becoming an important business tool. Many workers use two or more computers to perform their jobs, and consequently, it is necessary to transfer information between computers on a regularly basis. There are many communication programs available to allow communication between computers through the telephone lines, provided each computer has a modem.

Two types of computer-to-computer communications are extremely important. The first is transferring files between computers. In this scenario, a user establishes a connection between two computers, and selects files for transfer over the telephone lines. This type of communication is used, for example, where a user needs a document from his or her work computer for further editing at home.

The second type of communication allows the user to control a remote computer. This type of communication is used, for example, when a user needs to access a program which is not on his or her home computer. In this type of communication scenario, an application program is executed on the host (work) computer under control of commands issued from the remote (home) computer. Remote access software transfers commands from the home computer to the work computer and transfers display information from the work computer to the home computer.

Communication between computers, however, is subject to several problems. First, the host computer must be left in a powered-on state in order to form a communication link with the accessing remote computer. Leaving a computer in a powered-on state for extended periods of nonuse in order to allow a possible communication can be expensive and is a waste of energy resources. For example, if a user leaves on a business trip for a week, but wishes to communicate with the office computer via a notebook computer, the office computer would be left in a powered-on state for an entire week, even though the actual time of communication between the two computers was less than one hour. Alternatively, another worker would have to manually power the computer on and off. Such manual intervention is also expensive.

Second, during communications, the remote computer may stop or "hang" during a communication session. Once the computer hangs, the communication must be terminated, and no further communication sessions can be started until the computer is reset. Resetting the computer requires manual intervention, which is not always available.

Some external hardware devices allow activation of a computer through a switched AC power source connected to the telephone line. These devices enable or disable the AC power to the computer and therefore require high voltage switching circuitry, along with their own power supply. Accordingly, the cost of these external devices is very high.

Therefore, a need has arisen in the industry to provide remote control of system power.

SUMMARY OF THE INVENTION

In accordance with the present invention, a computer with power switching capabilities is described which eliminates substantial disadvantages associated with prior devices.

In the present invention, a computer system comprises data processing circuitry which is coupled to power circuitry through a switched power node. Responsive to a communications control signal, switching circuitry is operable to control the output of the switched power node in order to enable or disable the data processing circuitry.

The present invention provides significant advantages over the prior art. The invention may be implemented entirely in hardware and retains full compatibility with current versions of communication software. In the case of a non-recoverable system error, the invention may produce a "cold" system reset, leaving the computer's hardware and software in a known, working state. Since the power is controlled by a communications control signal, there is no need for a second party intervention or a manual administration of the computer. Since full power is applied to the computer only when accessed through the remote device, significant energy resources are conserved.

BRIEF DESCRIPTION OF THE DRAWINGS

For a more complete understanding of the present invention, and the advantages thereof, reference is now made to the following descriptions taken in conjunction with the accompanying drawings, in which:

FIG. 3b illustrates the operation of the control logic for the switch control circuitry of FIG. 3a;

DETAILED DESCRIPTION OF THE INVENTION

The preferred embodiment of the present invention and its advantages are best understood by referring to FIGS. 1–5 of the drawings, like numerals being used for like and corresponding parts of the various drawings.

Figure 1:
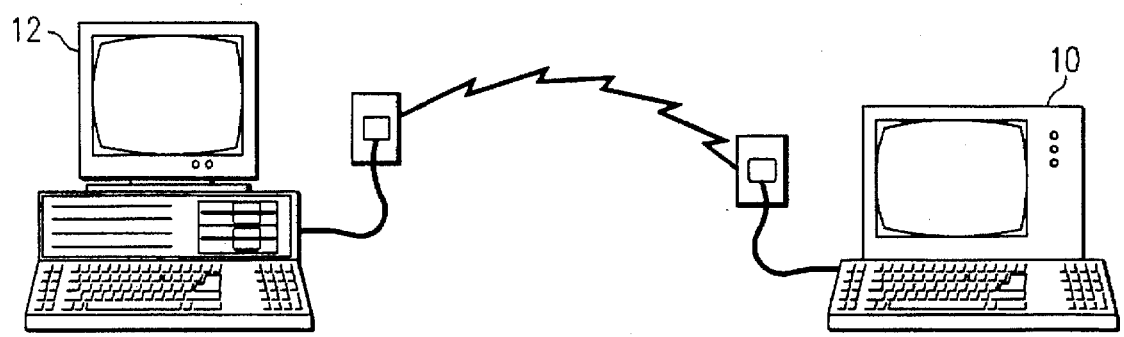
FIG. 1 illustrates two computers coupled via telephone lines.

FIG. 1 illustrates a telephonic communication between two computers 10–12. For purposes of this specification, the computer being accessed will be referred as the "host" computer 12 and the accessing computer will be referred as the "remote" computer 10. Further, it will be assumed that the host computer 12 and remote computer 10 are communicating over standard telephone lines, although the invention will work in other communication structures, such as networks.

To communicate over telephone lines, each computer 10–12 uses a modem. The modem may be either internal or external, as will be described in greater detail hereinbelow.

In the prior art, to access the host computer 12 from the remote computer 10, manual intervention was necessary to power the computer 12 in order to allow communications between the two computers. Either the user could leave the host computer 12 in a powered-on condition, or another party could manually turn the host computer on and off.

In the present invention, however, the host computer 12 may be placed in a "standby" power made wherein power is supplied to selected portions of the circuitry necessary to monitor the telephone line to receive a request for access via the telephone lines. When the host computer's modem detects a valid carrier, a signal is output which places the computer in a full-power mode, wherein power is supplied to all of the circuitry. Upon receiving a request for access, the host computer 12 powers the remaining circuitry, thereby assuming a fully powered-on state. Upon the initiation of the full-power mode, the host computer 12 will assume a known hardware and software state. Most computers, such as IBM-compatible computers, may selectively load and execute software programs at start-up (or after a "cold" or "warm" reset) through one or more batch command files. For IBM-compatible computers, these files are known as "autoexec.bat" and "config.sys".

The communication link ends upon hang-up by the remote computer 10. When the host computer's modem recognizes the hang-up condition, the host computer 12 returns to the standby-power mode.

This aspect of the preferred embodiment provides several advantages. First, the host computer 12 may be placed in a low power state while not being accessed, thereby conserving energy resources. The host computer automatically transfers from a standby state to a full-power state upon receiving a call requesting a communication. At the end of the communication, the host computer 12 automatically returns to a low-power standby state. If the host computer 12 hangs during a communication session, the user may reset the host computer 12 by hanging up the modem of the remote computer (which will force the host computer into standby mode) and recalling the host to place it in full-power mode (which will place the host computer 12 in a known hardware and software state).

In the preferred embodiment, an "override" feature is provided whereby a user at the site of the host computer 12 may override the standby feature in order to use the computer. For example, by entering a keystroke sequence "CNTL-ALT-O", (by simultaneously pressing "CNTL", "ALT" and "O" keys) the host computer 12 transitions from the standby state to the full-power state. By entering a second sequence (which may be the same sequence previously entered), the computer 12 returns to standby state. Alternatively, or in conjunction with the keyboard sequence detection, a switch may be provided to override the standby power mode. The override feature is discussed in greater detail in connection with FIG. 3.

Figure 2:
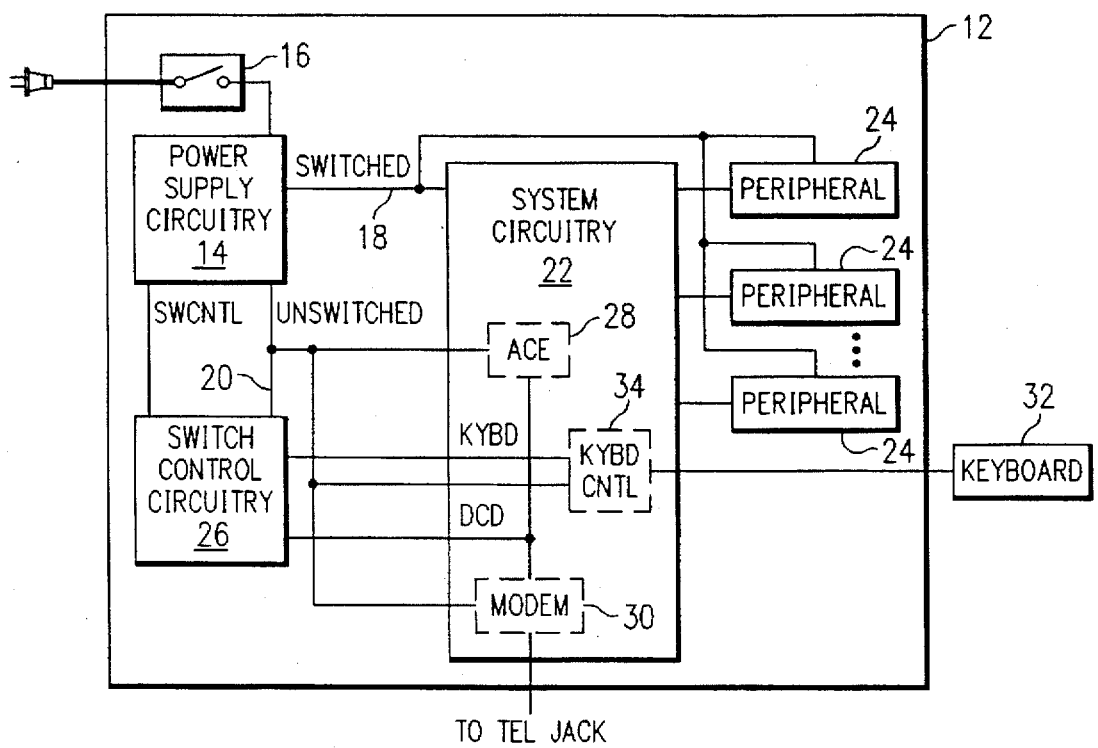
FIG. 2 illustrates a block diagram of a computer having asynchronous power switching capabilities.

FIG. 2 illustrates a block diagram of a computer incorporating the preferred embodiment of the present invention. The computer 12 includes power supply circuitry 14 coupled to a power source (such as an AC outlet) via main power switch 16. Power supply circuitry 14 outputs switched power lines 18 and unswitched power lines 20. Switched power lines 18 and 20 may output, for example, ±5 VDC, ±12 VDC and ground. Power supply circuitry is coupled to the motherboard 21, which includes system circuitry 22, switch control circuitry 26 and modem 30. The switched power lines 18 are coupled to the system circuitry 22 and peripherals 24. The unswitched power lines 20 are coupled to switched control circuitry 26 and portions of the system circuitry 22 including asynchronous control element (ACE) 28 and modem 30. Modem 30 outputs communication control signals to ACE 28 and switching control circuitry 26. System circuitry 22 outputs keyboard (KYBD) signals to switch control circuitry 26. Switch control circuitry 26 outputs a switch control signal (SWCNTL) to power supply circuitry 14. Keyboard 32 is coupled to system control circuitry 22.

In the preferred embodiment, system control circuitry 22 includes the circuits normally found on a computer motherboard (or connected to the motherboard bus), such as the CPU, RAM memory, BIOS, bus circuitry, video controllers and disk controllers.

Power supply 14 outputs two sets of power lines, switched power lines 18 and unswitched power lines 20. Unswitched power lines 20 output the desired voltages whenever switch 16 is enabled. Switched power lines 18 output desired voltages only when signal SWCNTL is in a predetermined state. For purposes of illustration, switched power lines 18 are active when SWCNTL is a "1".

On initial power-up, i.e., when switch 16 is first enabled, SWCNTL is set to "0". Thus, switched power lines 18 are initially inactive and the computer is in the standby state. Switch control circuitry 26 receives signals from keyboard 32 and modem 30. Specifically, switch control circuitry 26 receives a DCD signal from modem 30. When the DCD signal indicates that a request for communication from a remote computer is present, switch control circuitry 26 sets SWCNTL high to enable the switched power lines 18. Thereafter, the remainder of the system circuitry 22 is powered, and the computer 12 is placed in a fully-powered state. The transition from an unpowered to a powered state is commonly referred as "a cold boot". As a result of the cold boot, the hardware and currently running software will assume a known state. The host computer 12 remains in a full-power state until the DCD signal indicates that the carrier is no longer valid (i.e., that remote computer has hung-up).

Figure 3A:
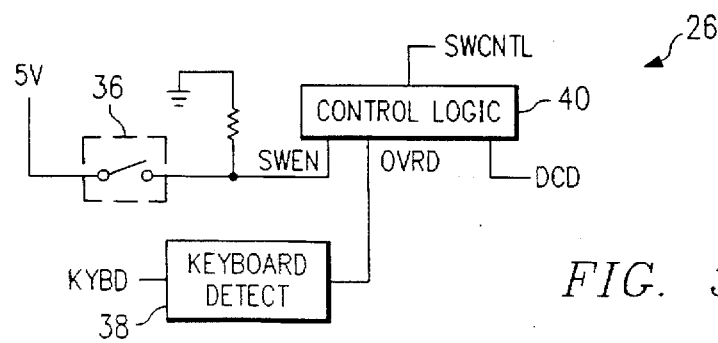
FIG. 3a illustrates a block diagram of switch control circuitry used in the computer of FIG. 2.

FIG. 3a illustrates a block diagram of the switch control circuitry 26. Switch control circuitry 26 comprises an override switch 36, keyboard detect circuitry 38 and control logic 40. Override switch 36 outputs the SWEN (switch enabled) signal to control logic 40. When the switch 36 is enabled, SWEN is at a high logic level ("1") and when switch 36 is disabled SWEN is a low logic level ("0"). Keyboard detect circuitry 38 detects a key combination or sequence, such as CNTL-ALT-O and sets the OVRD signal appropriately. For example, the key sequence CNTL-ALT-O may toggle the OVRD signal, such that upon the first detection of the sequence, OVRD is set to "1" and on the second occurrence of the sequence, the OVRD signal is set to "0". Control logic 40 sets the SWCNTL signal in accordance with the SWEN, OVRD and DCD signals. For illustrative purposes, it is assumed that DCD is set to "1" by modem 30 when there is a valid carrier detected and is set to "0" when there is no carrier detected.

Figure 3B:
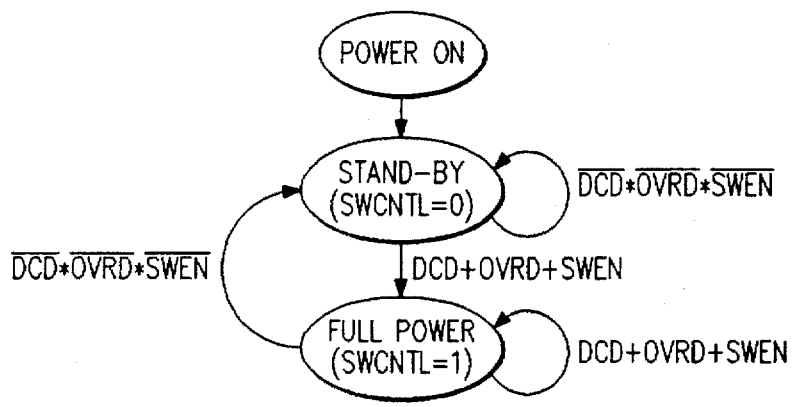

FIG. 3b illustrates a state diagram for the preferred embodiment of control logic 40. Initially, upon start-up through switch 16, control logic 40 sets SWCNTL to "0". Hence, at this time, computer 12 is in the standby power mode. Control logic 40 keeps signal SWCNTL equal to "0" until one of the signals SWEN, OVRD or DCD is set to "1". When one of the signals is set to "1", the SWCNTL signal is set to "1", thereby placing the computer 12 in a full power mode. The computer 12 remains in the full power mode until all three signals—SWEN, OVRD and DCD—are set to "0".

Figure 4:
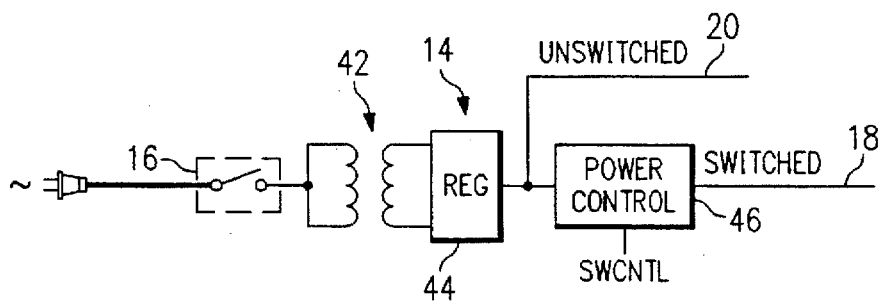
FIG. 4 illustrates a block diagram of the power supply circuitry used in the computer of FIG. 2.

FIG. 4 illustrates a block diagram of the power supply circuitry 14. The power supply circuitry shown in FIGS. 2 and 4 assumes that computer 12 is a desktop computer coupled to an AC power supply; however, computer 12 could also be a portable computer using a battery power source as well. In the embodiment shown in FIG. 4, the AC power is input to transformer 42. The output of transformer 42 is coupled to regulator 44 which outputs the desired voltages (±5 VDC, ±12 VDC, or other desired voltages). The output of regulator 44 is coupled to the unswitched power lines and to a power control circuit 46, which may be, for example, a bank of tristate devices. When SWCNTL equals a "1", the switched power lines are electrically coupled to the output of regulator 44, otherwise, the switched power lines are floating.

Figure 5:
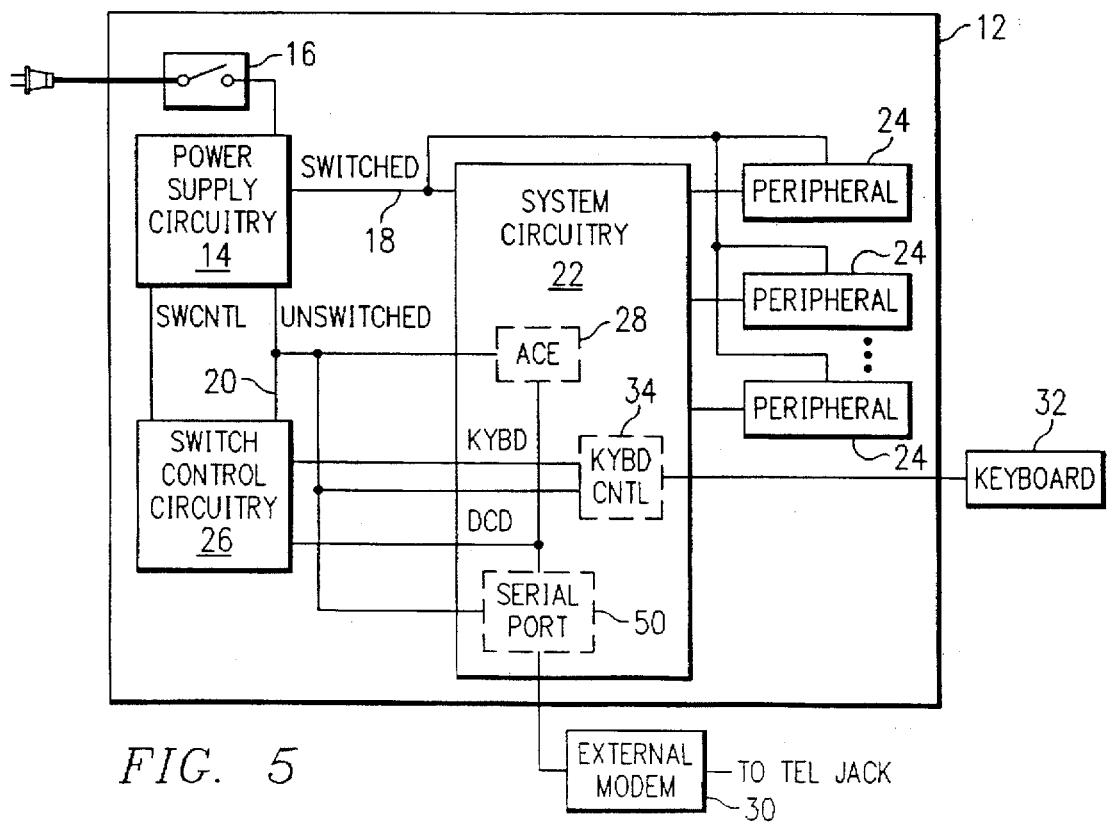
FIG. 5 illustrates a block diagram of a computer providing asynchronous power switching through a serial port.

FIG. 5 illustrates a block diagram of a second embodiment of the present invention. In this embodiment, an external modem 48 is coupled to the computer 12 through a serial port 50. The operation of the circuit of FIG. 5 is identical to the operation of the circuit of FIG. 2 except the control signal (DCD) is received from the modem 30 through serial port 50 rather than directly from the modem 30.

The present invention provides significant advantages over the prior art. First, it allows a user to selectively power a host computer as necessary for remote communications without manual interventions. Secondly, the invention may be implemented solely in hardware with only minor revisions to existing board architectures. Third, the present invention is compatible with standard modems and communication software without modification.

Unlike external AC power switching devices, the present invention does not require high voltage switching circuitry, since only the logical voltage signals are switched. Further, the switch control circuitry of the present invention can be software controlled, for example, through the keyboard.

Although the present invention and its advantages have been described in detail, it should be understood that various changes, substitutions and alterations can be made herein without departing from the spirit and scope of the invention as defined by the appended claims.

What is claimed is:

1. A computer system comprising:
   data processing circuitry;
   a single power supply for receiving power from an AC power source and generating a DC power therefrom, said power supply including a switched power node that supplies DC power to said data processing circuitry responsive to a power control signal and an unswitched power node that supplies DC power independent of said power control signal;
   circuitry for outputting a communications control signal indicating a request for communication from a remote computer; and
   switching circuitry coupled to said unswitched power node and said outputting circuitry for generating said power control signal to said power supply responsive to said communications control signal,
      wherein said switching circuitry comprises circuitry for detecting a first state of the communication control signal and disabling power through said switched power node responsive thereto,
      and wherein said switching circuitry further comprises override circuitry for enabling power through said switched power node while said communication control signal is in said first state, wherein said override circuitry comprises circuitry for detecting a predetermined keyboard sequence and enabling power through the switched power node responsive thereto.

2. The computer system of claim 1 wherein said override circuitry further comprises circuitry for detecting a second predetermined keyboard sequence and disabling power through the switched power node responsive thereto.

3. A method of controlling power in a computer comprising the steps of:
   generating DC power in a single power supply having switched and unswitched power nodes for powering the computer's internal circuitry;
   powering switching circuitry in the computer with said DC power through said unswitched power node of the power supply;
   selectively powering processing circuitry for processing data in the computer with said DC power through said switched power node of the power supply; and
   controlling said switched power node responsive to a communications control signal generated in the computer responsive to a request to communicate with the computer from a remote computer, such that said DC power through said switched power node is applied to the processing circuitry responsive to a predetermined state of the communications control signal, wherein said controlling step comprises the step of enabling power through said switched power node responsive to receiving a predetermined keyboard sequence.

4. A computer system comprising:
   a single power supply for DC power, said power supply including a switched power node that supplies DC power responsive to a power control signal and an unswitched power node that supplies DC power independent of said power control signal;
   first data processing circuitry coupled to said switched power node; and
   second data processing circuitry coupled to said unswitched power node, said second data processing circuitry including:
      circuitry for outputting a communications control signal indicating a request for communication from a remote computer;
      switching circuitry coupled to said unswitched power node and said outputting circuitry for generating said power control signal to said power supply responsive to said communications control signal; and
      keyboard control circuitry for recognizing one or more sequences keystrokes for a keyboard.

5. The computer system of claim 4 and wherein said second data processing circuitry further includes an asynchronous control element.

6. The computer system of claim 4, wherein said modem circuitry recognizes a hang-up condition from said remote computer.

7. The computer system of claim 6, wherein said computer system enters a standby mode responsive to said modem circuitry recognizing the hang-up condition from said remote computer.

* * * * *